(12) United States Patent
Neunhäuserer et al.

(10) Patent No.: US 11,193,675 B2
(45) Date of Patent: Dec. 7, 2021

(54) EXTRACTOR FAN APPARATUS FOR EXTRACTING COOKING VAPOURS DOWNWARDS

(71) Applicant: Wilhelm Bruckbauer, Neubeuern (DE)

(72) Inventors: Daniel Neunhäuserer, Neustift (AT); Philipp Lacatusu, Nussdorf am Inn (DE); Alexander Schadeck, Aschau i. Chiemgau (DE); Philipp Eschbaum, Raubling (DE); Siegfried Gössler, Bad Aibling (DE); Mario Blersch, Brannenburg (DE)

(73) Assignee: Wilhelm Bruckbauer, Neubeuern (DE)

( * ) Notice: Subject to any disclaimer, the term of this patent is extended or adjusted under 35 U.S.C. 154(b) by 199 days.

(21) Appl. No.: 16/230,166

(22) Filed: Dec. 21, 2018

(65) Prior Publication Data

US 2019/0195511 A1    Jun. 27, 2019

(30) Foreign Application Priority Data

Dec. 27, 2017    (DE) ...................... 10 2017 223 828.3

(51) Int. Cl.
*F24C 15/20*    (2006.01)
*B01D 46/46*    (2006.01)
*B01D 46/00*    (2006.01)

(52) U.S. Cl.
CPC ...... *F24C 15/2021* (2013.01); *B01D 46/0041* (2013.01); *B01D 46/46* (2013.01); *F24C 15/2035* (2013.01); *F24C 15/2042* (2013.01); *B01D 2279/35* (2013.01)

(58) Field of Classification Search
CPC .. F24C 15/2042; F24C 15/2035; F24C 15/20; A47B 2200/06; B08B 15/007; A47J 36/38; H05B 6/1209; B01D 46/02; B01D 46/24; B01D 46/2403
See application file for complete search history.

(56) References Cited

U.S. PATENT DOCUMENTS 1,521,577 A * 12/1924 Wittemeier ............ B01D 46/12
55/418
4,846,146 A    7/1989 Tucker et al.
4,962,694 A    10/1990 Graver
(Continued)

FOREIGN PATENT DOCUMENTS

DE    20 2008 013 350 U1    1/2009
DE       202009017271 U1    3/2010
(Continued)

*Primary Examiner* — Jorge A Pereiro
(74) *Attorney, Agent, or Firm* — McGlew and Tuttle, P.C.

(57) ABSTRACT

The invention relates to an extractor fan apparatus for extracting cooking vapours downwards. The extractor fan apparatus comprises at least one fan for aspirating the cooking vapours, an inflow opening for the entry of the cooking vapours into the extractor fan apparatus, a filter seat which is arranged downstream of the at least one fan and on which at least one filter for filtering the cooking vapours can be arranged, and a filter replacement space which extends between the inflow opening and the at least one filter seat, the filter replacement space being configured for the reversible removal of the at least one filter from the filter seat through the inflow opening.

22 Claims, 7 Drawing Sheets

(56) References Cited

U.S. PATENT DOCUMENTS

| | | | | |
|---|---|---|---|---|
| 5,268,012 | A * | 12/1993 | Jang | B01D 46/24 126/299 D |
| 5,482,622 | A * | 1/1996 | Stark | B01D 46/24 210/232 |
| 5,679,122 | A * | 10/1997 | Moll | B60H 3/0608 55/497 |
| 5,738,083 | A * | 4/1998 | Pettinari | F24C 15/20 126/299 D |
| 6,050,774 | A * | 4/2000 | LeBaron | B01D 46/0005 415/121.2 |
| 6,471,738 | B1 * | 10/2002 | Thompson | B01D 46/24 55/471 |
| 7,083,659 | B1 * | 8/2006 | Joyce | F21V 33/0088 55/385.1 |
| 8,639,149 | B2 * | 1/2014 | Tanaka | B41J 29/377 399/93 |
| 2004/0104227 | A1 * | 6/2004 | Hoh | F24C 15/00 219/757 |
| 2011/0146657 | A1 * | 6/2011 | Briedis | F24C 15/2042 126/39 E |
| 2012/0111197 | A1 * | 5/2012 | Weisman | B01D 46/0009 95/273 |
| 2012/0204855 | A1 * | 8/2012 | Huber | F24C 15/2035 126/299 R |
| 2013/0199142 | A1 * | 8/2013 | Kerr, Jr. | F24F 13/28 55/493 |
| 2014/0048057 | A1 * | 2/2014 | Bruckbauer | F24C 15/2042 126/299 D |
| 2014/0079595 | A1 * | 3/2014 | Kao | A61L 9/205 422/121 |
| 2015/0354584 | A1 * | 12/2015 | Iwata | F04D 29/288 415/203 |
| 2016/0296870 | A1 * | 10/2016 | Mckechnie, IV | B01D 46/009 |
| 2018/0070473 | A1 * | 3/2018 | Zhang | G06F 1/181 |
| 2018/0209662 | A1 * | 7/2018 | Adam | F24C 15/2042 |
| 2018/0229171 | A1 * | 8/2018 | Adam | F24C 15/32 |
| 2018/0306449 | A1 * | 10/2018 | Flesch | F24C 15/2042 |
| 2018/0328605 | A1 * | 11/2018 | Bae | B01D 46/42 |
| 2019/0162421 | A1 * | 5/2019 | Cimino | F24C 15/2042 |
| 2019/0203949 | A1 * | 7/2019 | Konneker | F24C 15/2021 |
| 2019/0212016 | A1 * | 7/2019 | Konneker | F24C 15/2042 |
| 2020/0278118 | A1 * | 9/2020 | Berling | B01D 45/14 |

FOREIGN PATENT DOCUMENTS

| | | |
|---|---|---|
| DE | 102008054775 A1 | 6/2010 |
| DE | 10 2011 018 962 A1 | 10/2012 |
| DE | 10 2011 082 924 A1 | 3/2013 |
| DE | 10 2016 109 136 A1 | 11/2017 |
| JP | 2004160409 A * | 6/2004 |
| KR | 20030053864 A * | 7/2003 |
| WO | 2017/029135 A1 | 2/2017 |
| WO | 2017029134 A1 | 2/2017 |
| WO | 2017/103708 A1 | 6/2017 |
| WO | 2017089925 A1 | 6/2017 |
| WO | 2019038632 A1 | 2/2019 |
| WO | 2019081271 A1 | 5/2019 |

* cited by examiner

EXTRACTOR FAN APPARATUS FOR EXTRACTING COOKING VAPOURS DOWNWARDS

CROSS-REFERENCES TO RELATED APPLICATIONS

This application claims the priority of German Patent Application, Serial No. 10 2017 223 828.3, filed Dec. 27, 2017, pursuant to 35 U.S.C. 119(a)-(d), the content of which is incorporated herein by reference in its entirety as if fully set forth herein.

FIELD OF THE INVENTION

The invention relates to an extractor fan apparatus. Furthermore, the invention is directed to a filter for an extractor fan apparatus, and to a hob system.

BACKGROUND OF THE INVENTION

WO 2017/103708 A1 discloses an extractor fan apparatus for extracting cooking vapours downwards. The extractor fan apparatus comprises a fan for aspirating the cooking vapours, and a filter seat which is arranged downstream of the fan and on which a filter for filtering the cooking vapours can be arranged. For the reversible removal of the filter, the extractor fan apparatus has a removal opening which penetrates a hot plate of a hob in a manner which adjoins an inflow opening. The hot plate is weakened mechanically in the region of the removal opening and is not available for cooking zone positions for heating food to be cooked. The removal opening which is required merely for maintenance purposes prevents a plain and tidy appearance of the extractor fan apparatus.

SUMMARY OF THE INVENTION

It is an object of the invention to improve an extractor fan apparatus.

Said object is achieved by way of an extractor fan apparatus for extracting cooking vapours downwards, having at least one fan for aspirating the cooking vapours, an inflow opening for the entry of the cooking vapours into the extractor fan apparatus, a filter seat which is arranged downstream of the at least one fan and on which at least one filter for filtering the cooking vapours can be arranged, and a filter replacement space which extends between the inflow opening and the at least one filter seat, the filter replacement space being configured in such a way that the at least one filter is reversibly removable from the filter seat through the inflow opening. It has been recognized in accordance with the invention that the filter replacement space which extends between the filter seat which is arranged downstream of the fan and the inflow opening can be configured in such a way that the at least one filter is reversibly removable from the filter seat through the inflow opening. A removal which is cumbersome and complicated for the user via a lower space of the extractor fan apparatus is dispensed with as a result of the accessibility of the inflow opening and therefore of the filter from a region above the extractor fan apparatus. The reversible removability of the filter through the inflow opening ensures that a surface which adjoins the inflow opening, in particular an upper side of a hob, is kept free from additional removal openings. The upper side of the hob is therefore available for heating food to be cooked. An additional sealing device for protecting removal openings of this type against spilled liquids can be dispensed with. Structural weakening of the hob as a result of the introduction of additional removal openings is prevented. The fan extractor apparatus overall has a plain and tidy appearance.

The filter replacement space establishes a spatial connection between the inflow opening and the filter seat. The at least one filter can be moved between the filter seat and the inflow opening in the filter replacement space. To this end, at every location, the filter replacement space has an inner free cross section which is greater than a cross section of the at least one filter. The filter replacement space can be configured, in particular in sections, by way of a flow channel for guiding the cooking vapours. This advantageously achieves a situation where additional structures can be dispensed with for the configuration of the filter replacement space. As an alternative, the filter replacement space can be configured, in particular in sections, outside the flow channel.

The filter is preferably arranged upstream of the filter seat. As a result of the arrangement of the filter upstream of the filter seat, the cooking vapour flow presses the filter against the filter seat during operation of the extractor fan apparatus. As a result, the filter can be attached to the filter seat in a particularly fixed, in particular sealed manner.

In accordance with one aspect of the invention, the extractor fan apparatus has an inflow opening for the entry of the cooking vapours into the extractor fan apparatus. This is to be understood to mean that the extractor fan apparatus according to the invention has at least one inflow opening. The extractor fan apparatus can also have at least two, in particular at least three, in particular at least four inflow openings. The inflow opening is preferably configured to be round, in particular circular or non-circular, in particular oval, or in the form of a polygon, in particular in the form of a rectangle, in particular in the form of a square.

According to one aspect of the invention, the extractor fan apparatus has at least one fan. The extractor fan apparatus can also have at least two, in particular at least three, in particular at least four fans. The at least one fan can be arranged spaced apart from a geometric centroid of the inflow opening in a plan view. As an alternative, the at least one fan can be arranged concentrically with respect to the inflow opening. The concentric arrangement of the fan with respect to the inflow opening advantageously achieves a situation where cooking vapours are aspirated in particularly efficiently in terms of flow mechanics. A rotational axis of the at least one fan can be oriented horizontally or vertically.

The at least one filter can be arranged on the filter seat. At least two, in particular at least three, in particular at least four, in particular at least five filters can preferably be arranged on the filter seat. The filter area and/or a flow opening of the filter seat can be enlarged by way of the arrangement of a plurality of filters on the filter seat, the reversible removability of the at least one filter from the filter seat through the inflow opening being preserved. The at least two filters are preferably configured such that they can be attached to one another, in particular in a fluid-tight manner.

The at least one filter can preferably be removed from the filter seat through the inflow opening manually, in particular by hand and/or without tools. To this end, the filter replacement space and/or the filter seat can be of corresponding configuration.

In accordance with one aspect of the invention, the at least one filter is arranged in a positive pressure channel section. The positive pressure channel section is understood to mean that section of the flow channel which lies downstream of the at least one fan. This advantageously achieves a situation where the flow resistance of the at least one filter has a smaller influence on the extraction performance of the extractor fan apparatus than a filter which is arranged in a negative pressure channel section. The negative pressure channel section is understood to mean that section of the flow channel which lies upstream of the at least one fan. In addition, a regular filter change and/or filter cleaning are/is facilitated by way of the reversible removability of the filter through the inflow opening. As a result, the flow resistance of the filter can be reduced and the function of the extractor fan apparatus can be maintained.

In accordance with one aspect of the invention, a guide device for the guided displacement of the at least one filter is arranged in the filter replacement space. The guide device can be configured by way of a wall of the filter replacement space. The guide device is preferably configured for linear mounting of the at least one filter. In the case of the linear mounting, the displacement can take place exclusively along one line. Together with the at least one filter, the guide device can configure a tongue and groove connection and/or a slotted guide. The guide device can also be configured in the form of a channel, in which the at least one filter is mounted such that it can be displaced in a linear manner. This advantageously achieves a situation where the at least one filter is removable from the filter seat reliably, in particular without tilting.

In accordance with one aspect of the invention, the filter seat has a sealing means and/or a sealing face for the fluid-tight connection to the at least one filter. The sealing means preferably surrounds the flow opening of the filter seat completely. The sealing means can be configured to interact with a sealing face of the at least one filter. As an alternative, the filter seat can also have the sealing face and the at least one filter can have the sealing means. The fluid-tight attachment of the at least one filter to the filter seat ensures that the entire cooking vapour flow is guided through the at least one filter and does not flow around the latter.

In accordance with a further aspect of the invention, a transport channel is arranged in the filter replacement space, through which transport channel the at least one filter can be moved. The transport channel can extend between the negative pressure channel section and the filter seat. The transport channel is preferably arranged outside the at least one fan. The transport channel advantageously makes a particularly short connection between the filter seat and the negative pressure channel section possible. The length of the transport channel is preferably less than 200 mm, in particular less than 150 mm, in particular less than 100 mm, in particular less than 70 mm, in particular less than 50 mm, in particular less than 25 mm, in particular less than 10 mm. As a result, the reversible removal of the filter from the filter seat is made possible, without it being necessary for said filter to be guided through a fan housing of the fan.

The transport channel is preferably of fluid-tight configuration and is connected in a fluid-tight manner to the negative pressure channel section and the positive pressure channel section. This advantageously achieves a situation where both the negative pressure channel section and the positive pressure channel section are of fluid-tight configuration with respect to the surroundings.

In accordance with a further aspect of the invention, a closure flap for reversible closure with respect to a throughflow with the cooking vapours is arranged in the filter replacement space. The closure flap is preferably configured to separate, in a fluid-tight manner, a section of the filter replacement space which is connected to the negative pressure channel section from a section of the filter replacement space which is connected to the positive pressure channel section. The closure flap is preferably configured for the closure of the transport channel. The closure flap can be arranged within the transport channel or at one of the two ends of the transport channel. One closure flap can also be arranged at in each case one end of the transport channel. The closure flap can be capable of being moved between a closure position and an open position. The closure flap can be configured, for example, as a flap which is mounted in an articulated manner or as a displaceably mounted disc. In the open position, the at least one filter can be capable of being removed reversibly from the filter seat. This advantageously achieves a situation where, in the closure position, no pressure equalization between the positive pressure channel section and the negative pressure channel section can take place.

In the case of a displacement into the open position, the closure flap is preferably moved in the direction of the positive pressure channel section. This achieves a situation where a pressure difference between the positive pressure channel section and the negative pressure channel section aids the closure of the closure flap during operation of the extractor fan apparatus.

In accordance with a further aspect of the invention, the extractor fan apparatus has a control unit for operating the at least one fan. The extractor fan apparatus can have a sensor device which is signal-connected to the control unit. The control unit is preferably configured to interrupt the operation of the at least one fan on the basis of a signal of the sensor device. This advantageously achieves a situation where the operation of the at least one fan can be interrupted if there is a risk for a user and/or the extractor fan apparatus is not ready for operation.

In accordance with a further aspect of the invention, the sensor device has a filter sensor for detecting an arrangement of the at least one filter on the filter seat. The filter sensor can be configured as an end stop sensor, in particular as a pressure switch or as a solenoid switch, or in the form of a light barrier. The detection of the arrangement of the at least one filter on the filter seat ensures that the control unit can interrupt the operation of the at least one fan on the basis of a signal of the sensor device in the case of a missing and/or incorrect arrangement of the at least one filter on the filter seat.

In accordance with one aspect of the invention, the sensor device comprises a closure flap sensor for detecting an arrangement of the closure flap. The closure flap sensor is preferably configured as a sensing device or as a toggle switch or as a solenoid switch or as an inductive switch or as a capacitive switch or in the form of a light barrier. This advantageously achieves a situation where the control unit can interrupt the operation of the at least one fan on the basis of a signal of the sensor device in the case of an arrangement of the closure flap in the open position.

In accordance with a further aspect of the invention, the flow opening of the filter seat has a main dimension which is greater than a main dimension of the inflow opening. The flow cross section of the flow channel can therefore be of particularly great configuration in the region of the at least one filter relative to a main dimension of the inflow opening. This advantageously achieves a situation where the ratio between the filter action and the pressure loss is particularly great, it being possible for the extractor fan apparatus to be operated particularly efficiently.

The ratio between the main dimension of the flow opening and the main dimension of the inflow opening is preferably at least 1, in particular at least 1.2, in particular at least 1.5, in particular at least 2, in particular at least 2.5, in particular at least 3.

In accordance with a further aspect of the invention, an opening area of the flow opening is greater than an inflow area of the inflow opening. The ratio between the opening area and the inflow opening is preferably at least 1, in particular at least 1.5, in particular at least 2, in particular at least 2.5, in particular at least 3. This advantageously achieves a situation where the ratio between a filter action of the at least one filter and a pressure loss across the at least one filter is particularly high.

In accordance with a further aspect of the invention, the extractor fan apparatus has a drive device for the at least partially automated displacement of the at least one filter in the filter replacement space. The drive device can have a drive motor and a drive mechanism. The drive device, in particular the drive mechanism, is preferably in engagement with the at least one filter. To this end, the at least one filter can have a drive engagement means. The drive device is preferably configured to move the at least one filter onto the filter seat. As a result, particularly exact positioning of the at least one filter on the filter seat can be achieved. The at least one filter is preferably introduced into the filter replacement space first of all manually, in particular by hand, before the at least one filter is moved onto the filter seat by means of the drive device.

The drive device can be connected to the at least one filter via a gearwheel or a belt, in particular a toothed belt, or a linear drive.

In the following text, further features of the extractor fan apparatus according to the invention will be described, which further features can be combined freely with the features which have been mentioned up to now.

The at least one fan can be configured as a radial fan or as a centrifugal fan or as an axial fan. Between the inflow opening and an underside of the negative pressure channel section and/or an underside of the at least one fan, the extractor fan apparatus preferably has an overall height of at most 250 mm, in particular at most 220 mm, in particular at most 200 mm, in particular at most 175 mm, in particular at most 150 mm.

It is a further object of the invention to improve a filter.

This object is achieved by way of a reversibly deformable filter for an extractor fan apparatus. The reversible deformability is understood to mean that mechanical failure of the filter does not occur in the case of the deformation. The filter is preferably reversibly deformable in a purely elastic manner. The filter can be configured as an odour filter. The filter can also be configured as a grease filter and/or as a moisture filter. The filter can be of expansive configuration in the direction of its main dimension. The filter can also be of torsionally soft configuration about its centre longitudinal axis. The filter can be of pliable configuration about at least one axis which runs transversely with respect to the main dimension. The filter is preferably configured such that it can be rolled up. The filter can have at least two filter segments which can be attached to one another reversibly. The at least two filter segments are preferably attached to one another in an articulated manner and/or are connected to one another movably, in particular by way of a strap and/or a cord. The segmented configuration of the filter ensures the simple and disruption-free removal of the filter from the filter seat of the extractor fan apparatus.

The filter can be of pliable configuration. The filter can have a flexible, in particular pliable filter frame. The filter frame is preferably arranged in a neutral fibre of the filter. As a result of the arrangement of the filter frame in the neutral fibre of the filter, the length of the filter frame does not change substantially on account of the deformation of the filter. Here, the filter frame can be of pliable configuration.

As an alternative, the filter is of torsionally soft and/or expansive configuration. Here, the filter frame can be arranged in the neutral fibre or in the region of a smallest convex enveloping surface of the filter or in between.

The filter can have at least one fold. The filter is preferably pleated. As a result, the filter can be of deformable configuration. The fold can also lead to an increase in the surface area of the filter. The effectiveness of the filter can be improved as a result.

The filter can preferably be moved between a first and a second filter shape. In the first filter shape, a main dimension of the filter can be greater than in the second filter shape. A ratio between the main dimensions of the filter in the first and the second filter shape is preferably at least 1.2, in particular at least 1.5, in particular at least 2, in particular at least 3, in particular at least 4.

The filter can also be of pliable configuration about an axis transversely with respect to its longitudinal axis. The filter can preferably be bent about said axis by at least 10°, in particular at least 20°, in particular at least 30°, in particular at least 45°, in particular at least 60°.

In accordance with one aspect of the invention, the at least one filter has an actuating means. The actuating means can be configured as a handle for the manual removal from the extractor fan apparatus, in particular by hand. The actuating means can also be configured as a strap or as a cord. As a result, the reversible removal of the filter is facilitated.

In accordance with one aspect of the invention, the extractor fan apparatus comprises at least one filter of this type. The main dimension of the filter is preferably greater than the main dimension of the inflow opening. The ratio between the main dimension of the filter and the main dimension of the inflow opening is preferably at least 1, in particular at least 1.2, in particular at least 1.5, in particular at least 2, in particular at least 3, in particular at least 4. The flow cross section of the filter can be greater than the inflow area.

It is a further object of the invention to improve a hob system.

This object is achieved by way of a hob system having at least one extractor fan apparatus in accordance with the preceding description, and at least one hob for heating food to be cooked. The advantages result from those of the extractor fan apparatus.

The hob preferably has at least one, in particular at least two, in particular at least three, in particular at least four, in particular at least six cooking zones. The at least one cooking zone can be configured as a thermal radiation cooking zone and/or as an induction cooking zone and/or as a gas cooking zone and/or as an electric cooking zone. The hob comprises at least one hot plate and/or one power transmitter per cooking zone.

The at least one hot plate can be configured as a pot support and/or a support for food to be cooked. The at least one hot plate of the hob is preferably configured as a glass ceramic plate. The inflow opening is preferably arranged at the level of the hot plate. As an alternative, the inflow opening can also be arranged above the hot plate.

In accordance with one aspect of the invention, the inflow opening is surrounded completely by the hot plate in a plan view. The inflow opening preferably covers a geometric centroid of the hot plate in a plan view. The geometric centroid of the inflow opening preferably coincides with the geometric centroid of the hot plate.

In accordance with a further aspect of the invention, the hob system is configured as an assembled unit. This is to be understood to mean that the hob system can be preassembled completely at the factory. The extractor fan apparatus and the hobs are integrated, in particular, into a single device. The mounting of the hob, in particular the insertion of the hob into a cut-out of a kitchen counter, can therefore take place in a particularly simple, rapid and inexpensive manner. The hob system of this type is also called a combination device.

As an alternative, the hob system can be present as a kit. The kit can be configured in such a way that it can be assembled at least partially before the installation into the cut-out of the kitchen counter and/or that final assembly takes place in the cut-out.

An overall structural height of the assembled unit is preferably less than 250 mm, in particular less than 220 mm, in particular less than 200 mm, in particular less than 175 mm, in particular less than 150 mm Merely the at least one hob, the negative pressure channel section and the at least one fan are preferably to be taken into consideration for the determination of the overall structural height.

Further features, advantages and details of the invention result from the following description of the extractor fan apparatus and the hob system using the figures.

DESCRIPTION OF THE PREFERRED EMBODIMENTS

In the following text, different details of a hob system 1 and an extractor fan apparatus 2 will be described using FIG. 1 to FIG. 4.

Figure 1:
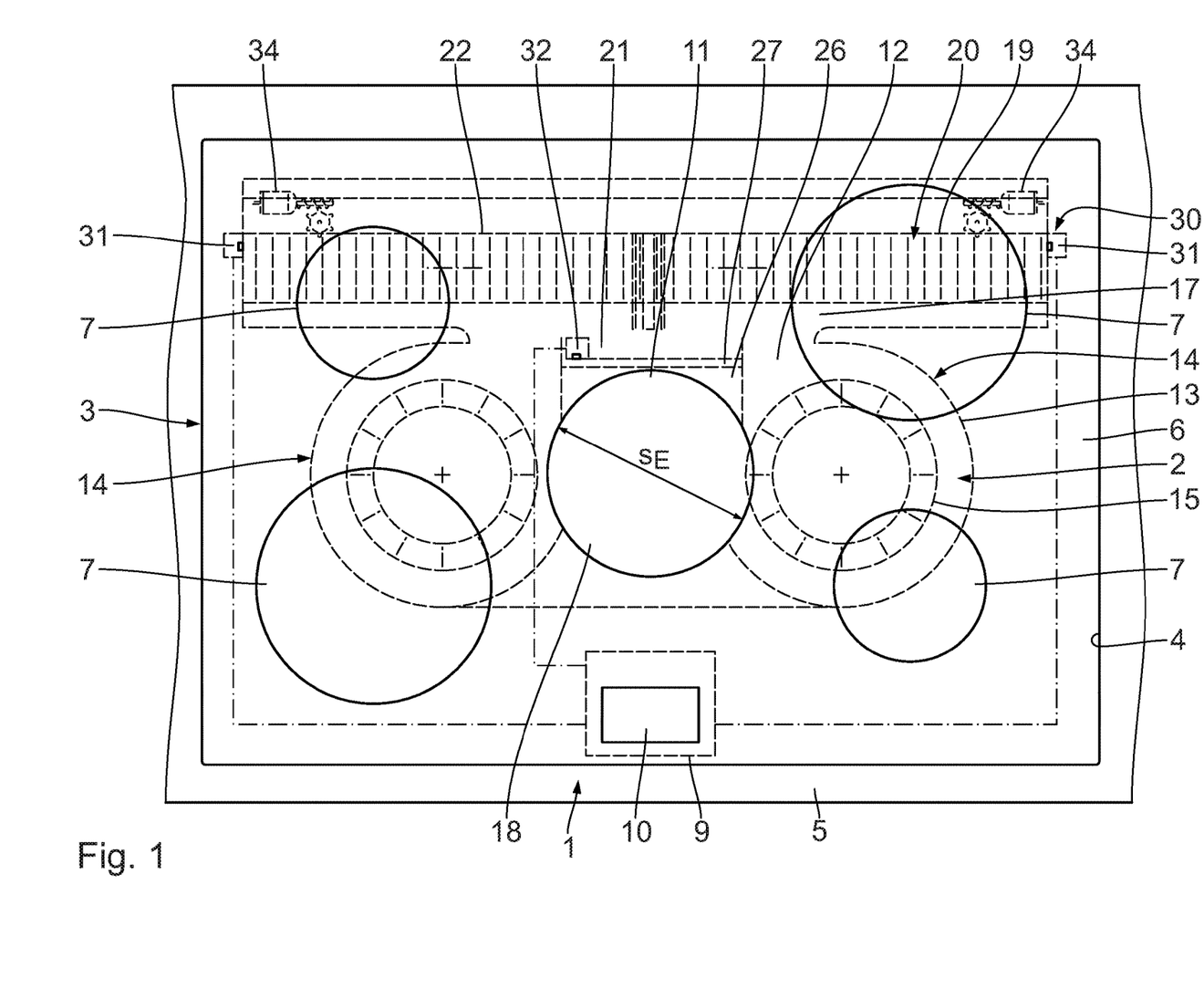
FIG. 1 shows a plan view of a hob system with a hob and an extractor fan apparatus.

FIG. 1 shows a hob system 1 with an extractor fan apparatus 2 for the extraction of cooking vapours, and a hob 3 for heating food to be cooked. The hob system 1 is configured as an assembled unit and is preassembled completely at the factory. The hob system is inserted into a cut-out 4 of a kitchen counter 5.

The hob 3 has a hot plate 6. Four cooking zones 7 are arranged on the hot plate 6. The cooking zones 7 have heating electronics (not shown). The heating electronics are surrounded by a hob housing 8.

The hob system has a control unit 9. The control unit 9 is signal-connected to a user interface 10. The user interface 10 is attached on the hot plate 6. The hot plate 6 is configured as a glass ceramic plate, and the user interface 10 is configured as a touch-sensitive screen.

The hob system 1 has an overall structural height of 200 mm. The hob system 1 is therefore configured as a compact assembled unit.

The extractor fan apparatus 2 comprises an inflow opening 11. The inflow opening 11 penetrates the hot plate 6. The inflow opening 11 is arranged in a centroid of the hot plate 6 in a plan view.

Figure 2:
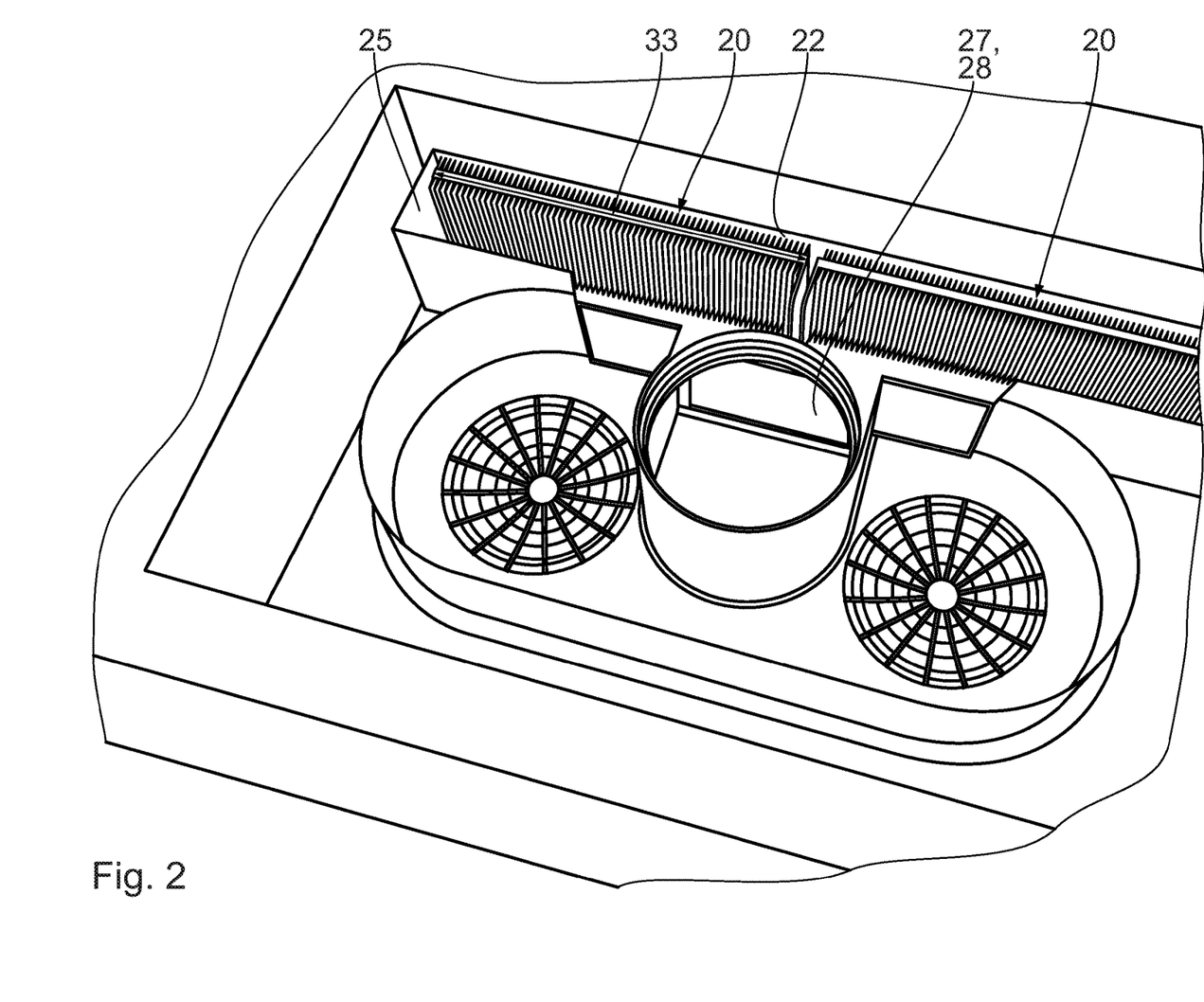
FIG. 2 shows a perspective illustration of the extractor fan apparatus in FIG. 1, a first filter and a second filter being arranged on a filter seat.

The extractor fan apparatus 2 has a flow channel 12 which is connected to the inflow opening 11. Two fan housings 13 are a constituent part of the flow channel 12. The two fan housings 13 are in each case also a constituent part of a fan 14. The respective fan 14 has a fan impeller 15 and a fan motor 16.

The extractor fan apparatus is configured to convey cooking vapours through the inflow opening 11 along the flow channel 12 and through the two fans 14. The flow channel 12 comprises a positive pressure channel section 17 which is arranged downstream of the fans 14 and a negative pressure channel section 18 which is arranged upstream of the fans 14 and downstream of the inflow opening 11.

A filter seat 19 is arranged in the positive pressure channel section 17. Two filters 20 for filtering the cooking vapours are arranged on the filter seat 19. The two filters 20 are configured as odour filters.

Figure 3:
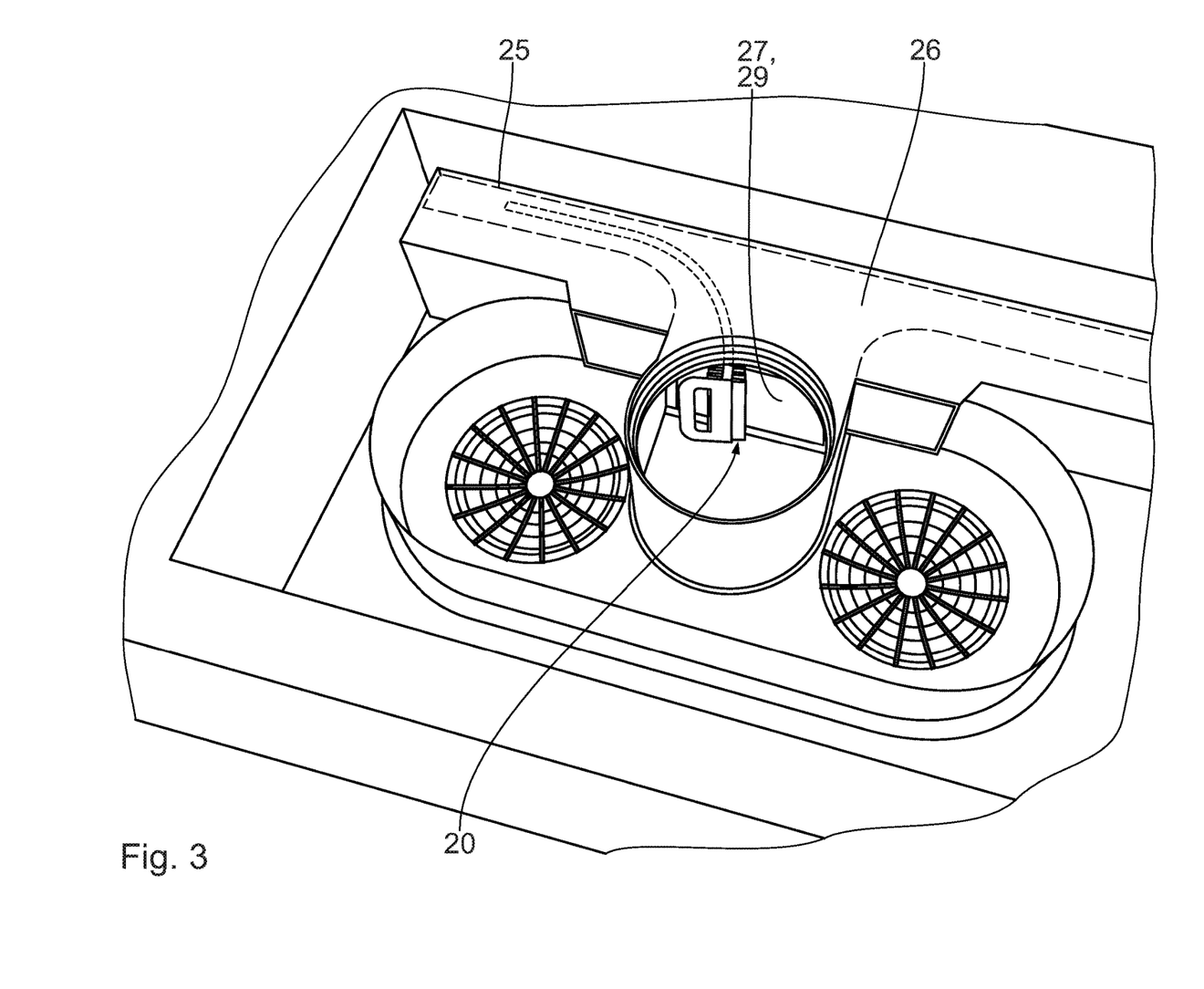
FIG. 3 shows a perspective illustration of the extractor fan apparatus in FIG. 1, the first filter being arranged in a filter replacement space between the filter seat and an inflow opening.

A filter replacement space 21 is arranged between the inflow opening 11 and the filter seat 19. The filter replacement space 21 is configured in such a way that the filter 20 is reversibly removable through the inflow opening 11. To this end, the filter replacement space 21 has an inner, free cross section, in which the respective filter 20 can be moved between the filter seat 19 and through the inflow opening 11. The filter seat 19 has a flow opening 22 (not shown). The flow opening 22 is flowed through completely by the cooking vapours. In the arrangement of the filter 20 on the filter seat 19, the two filters 20 cover the flow opening 22 completely. Here, the filters 20 are arranged in the flow channel 12 in such a way that the cooking vapour flow flows completely through them.

The filter seat 19 has a sealing means 23. The sealing means 23 is configured as a sealing lip. The sealing means 23 is produced from an elastomeric material. The sealing means 23 runs completely around the flow opening 22. The filter 20 has a sealing face 24. The sealing face 24 configures a fluid-tight connection together with the sealing means 23. As an alternative, the filter 20 can have the sealing means 23, and the filter seat 19 can be configured with a sealing face 24. In the arrangement of the filter 20 on the filter seat 19, the filter 20 is connected to the filter seat 19 in a fluid-tight manner. The two filters 20 which are arranged between the fans 14 and the flow opening 22 are configured such that they can be flowed through by cooking vapours.

Figure 4:
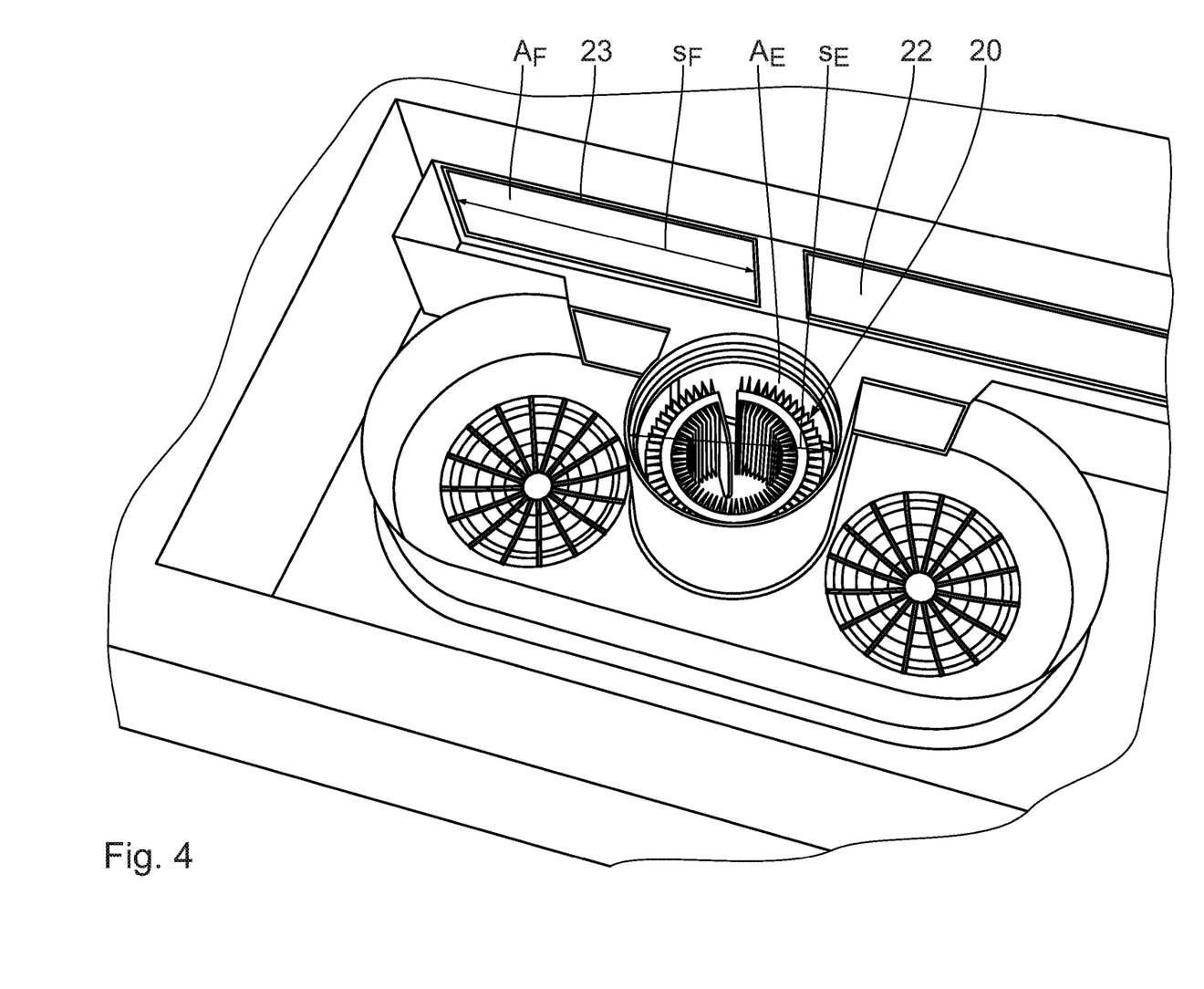
FIG. 4 shows a perspective illustration of the extractor fan apparatus in FIG. 1, the first filter being arranged in the filter replacement space and being covered completely by the inflow opening in a plan view.

FIG. 1 and FIG. 2 show the two filters 20 in their arrangement on the filter seat 19. In FIG. 3 and FIG. 4, a first filter 20 is arranged in the filter replacement space 21 between the filter seat 19 and the inflow opening 11. A second filter 20 has already been removed from the extractor fan apparatus 2 and is not shown.

The filter replacement space 21 has a guide device 25 for the guided displacement of the two filters 20. The guide device 25 is formed by way of the walls of the filter seat 19. During the introduction of the filters 20 into the filter seat 19, said filters 20 are guided between an upper and a lower wall, and by a rear-side wall of the filter seat 19, which rear-side wall has the flow opening 22.

The filter replacement space 21 comprises a transport channel 26. The transport channel 26 extends between the negative pressure channel section 18 and the positive pressure channel section 17. The respective filter 20 can be moved through the transport channel 26 between the filter seat 19 and the inflow opening 11. The filter replacement space 21 has a closure flap 27. The closure flap 27 is configured to close the filter replacement space 21 in a fluid-tight manner against the throughflow with cooking vapours. The closure flap 27 is mounted on the flow channel 12 in an articulated manner. The closure flap 27 can be moved between a closure position 28, in which the filter replacement space 21 is closed in a fluid-tight manner, and an open position 29, in which the filter replacement space is open for the reversible removal of the two filters 20. The closure flap 27 can be opened in the direction of the negative pressure channel section 18. As an alternative, the closure flap 27 can also be capable of being opened in the direction of the positive pressure channel section 17.

The control unit 9 is configured for the operation of the hob 3 and the extractor fan apparatus 2, in particular the two fans 14. The extractor fan apparatus 2 has a sensor device 30. The sensor device 30 comprises a filter sensor 31 for the detection of the arrangement of the two filters 20 on the filter seat 19. The sensor device 30 is signal-connected to the control unit 9. The control unit 9 is configured to interrupt the operation of the fan 14 on the basis of a signal of the sensor device 30. The sensor device 30 is configured in such a way that a signal for interrupting the operation of the fan 14 is provided if the filter sensor 31 detects a missing and/or incorrect arrangement of the two filters 20 on the filter seat 19.

The sensor device 30 has a closure flap sensor 32 for the detection of an arrangement of the closure flap 27. The sensor device 30 is configured to provide a signal for interrupting the operation of the fan 14 if the closure flap sensor 32 detects an arrangement of the closure flap 27 outside the closure position 28.

The flow opening 22 has a main dimension $s_F$. The main dimension $s_F$ is greater than a main dimension $s_E$ of the inflow opening 11. An opening area $A_F$ of the flow opening 22 is greater than an inflow area $A_E$ of the inflow opening 11.

The two filters 20 are of deformable configuration. The two filters 20 have in each case one main extent 33. The two filters 20 are configured in one piece and have a tensile rigidity in the direction of the main extent 33. The two filters 20 are of pliable configuration about an axis which is oriented perpendicularly with respect to the main extent 33. The respective filter 20 is configured such that it can be bent about a vertical axis for the reversible removal.

The extractor fan apparatus 2 has a drive device 34 for the automated displacement of the two filters 20 in the filter replacement space 21. The drive device 34 is configured to move the respective filter 20 along the guide device 25 onto the filter seat 19 or from the filter seat 19 in the direction of the inflow opening 11. The drive device 34 is signal-connected to the filter sensor 31 for correct positioning of the respective filter 20.

The method of operation of the hob system 1 is as follows:

The hob system 1 can be controlled via the control unit 9. User inputs are forwarded from the user interface 10 to the control unit 9. The control unit 9 is signal-connected to the cooking zones 7 and the fan motors 16. The control unit 9 allows the setting of the power which is fed to the cooking zones 7 and the fan motors 16.

In the case of the fan motors 16 being supplied with electric power, a torque is transmitted to the fan impellers 15. The rotating fan impellers 15 generate a lower negative pressure in the negative pressure channel section 18 in comparison with ambient pressure and a higher positive pressure in the positive pressure channel section 17 in comparison with ambient pressure.

Cooking vapours are produced above the hot plate 6 as a result of heating of the food to be cooked by way of the supply of power to the cooking zones 7. By way of the negative pressure which prevails in the negative pressure channel section 17, the cooking vapours are aspirated through the inflow opening 11 along the flow channel 12 to the fans 14, and are discharged through the filters 20 and the flow opening 22 from the extractor fan apparatus 2 in the positive pressure channel section 17.

FIG. 1 and FIG. 2 show the filters 20 arranged on the filter seat 19. The filter sensors 31 detect the arrangement of the filters 20 on the filter seat 19. The closure flap 27 is situated in the closure position 28. The closure flap sensor 32 detects the arrangement of the closure flap 27 in the closure position 28. The operation of the two fans 14 and their supply with electric power are therefore enabled.

In FIG. 3 and FIG. 4, the closure flap 27 is arranged in the open position 29. The first filter 20 is moved along the filter replacement space 21 in the direction of the inflow opening 11, and the second filter 20 has already been removed from the extractor fan apparatus 2. The filter sensor 31 detects the displacement of the respective filter 20 from the filter seat 19. The closure flap sensor 32 detects the arrangement of the closure flap 27 in the open position 29. The control unit 9 detects a signal of the sensor device 32 for interrupting the operation of the two fans 14. The operation of the two fan motors 16 is interrupted.

The removal of the two filters 20 from the filter seat 19 and the insertion into the filter seat 19 take place in a partially automated manner. For the automated displacement of the respective filter 20, the drive device 24 is in engagement with the respective filter 20. By way of actuation of the drive device 34, the respective filter 20 is moved along the guide device 25.

In order to remove the respective filter 20 through the filter replacement space 21 and the inflow opening 11, said filter 20 is curved about a vertical axis, in particular is rolled up. In the curved form, the filter 20 is removable from the extractor fan apparatus through the inflow opening 11.

In order to insert the respective filter 20 into the filter seat 19, the respective filter 20 is first of all deformed, in particular curved about the vertical axis, is subsequently introduced through the inflow opening 11 into the negative pressure channel section 18, and is moved along the filter replacement space 21 through the transport channel 26 and onto the filter seat 19 in a manner which is guided by the guide device 25. The displacement of the respective filter 20 takes place in a partially automated manner by way of actuation of the drive device 34. The filter sensors 31 detect the arrangement of the respective filter 20 on the filter seat 19. The closure flap 27 is moved into the closure position 28, and the closure flap sensor 32 detects the arrangement of the closure flap 27 in the closure position 28. The signal for interrupting the operation of the two fans 14 is cancelled, and the operation of the two fans 14 can be resumed.

Figure 5:
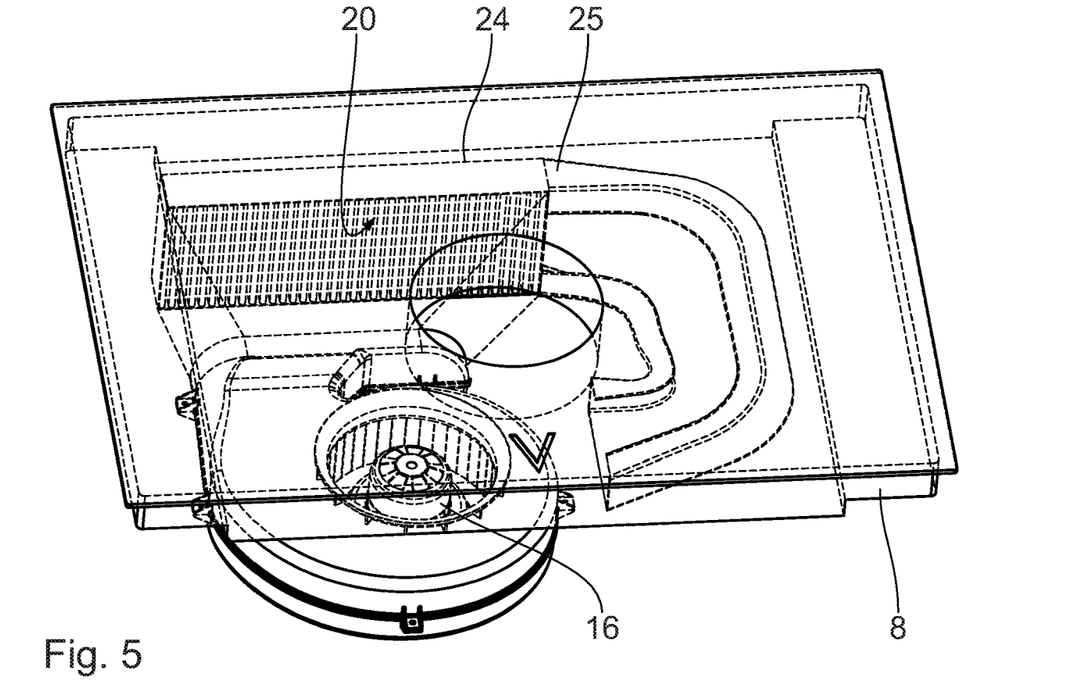
FIG. 5 shows a diagrammatic illustration of a hob system in accordance with a further exemplary embodiment, according to which the filter replacement space has a transport channel for moving a filter between the filter seat and the inflow opening, the filter being arranged on the filter seat.
Figure 6:
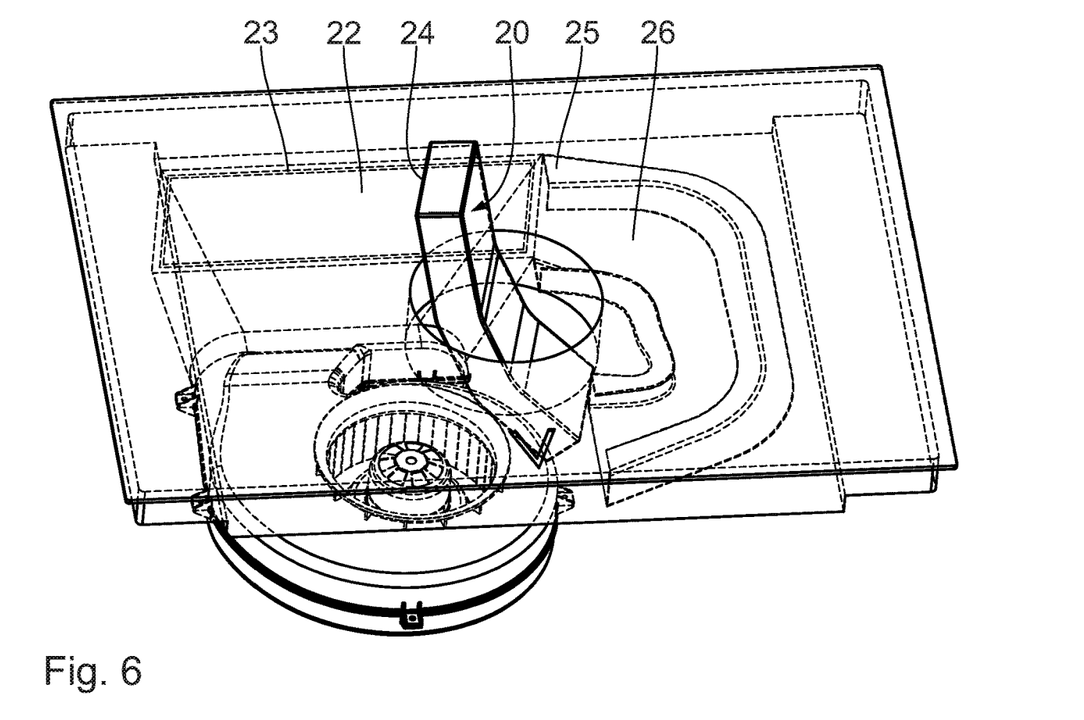
FIG. 6 shows a diagrammatic illustration of the hob system in FIG. 5, the filter penetrating the inflow opening and protruding partially into the filter replacement space.

A further exemplary embodiment of the invention is described using FIG. 5 and FIG. 6. In contrast to the preceding exemplary embodiment, the extractor fan apparatus 2 has merely one fan 14. A single filter 20 can be arranged on the filter seat 19. The displacement of the filter 20 within the filter replacement space 21 takes place in a completely manual manner, in particular by hand. The filter replacement space 21 has a transport channel 26. The wall of the transport channel 26 is configured to guide the filter 20, and is part of the guide device 25. The transport channel 26 extends between the negative pressure channel section 18 and the positive pressure channel section 17. On the side of the positive pressure channel section 18, the filter replacement space 21 can be closed reversibly by means of the closure flap 27.

In order to remove the filter 20 from the filter seat 19, said filter 20 is moved along the transport channel 26. Here, the filter 20 is bent about a plurality of axes transversely with respect to the main extent 33. The filter 20 is removed along its main extent 33 from the inflow opening 11.

Figure 7:
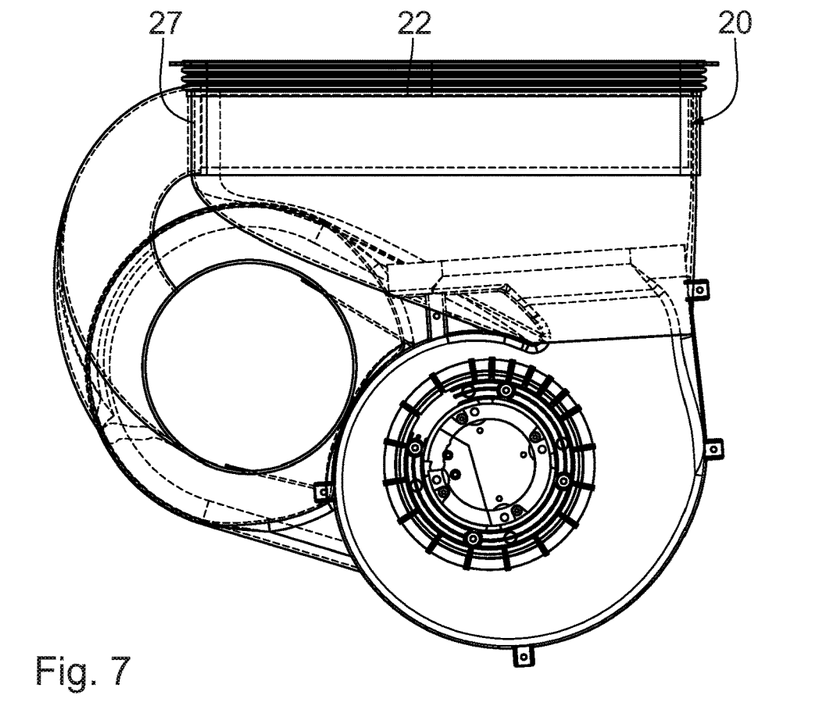
FIG. 7 shows a diagrammatic illustration of an extractor fan apparatus in accordance with a further exemplary embodiment, according to which the filter replacement space comprises a transport channel which extends between the filter seat and a negative pressure channel section which is arranged upstream of a fan, the filter being arranged on the filter seat.
Figure 8:
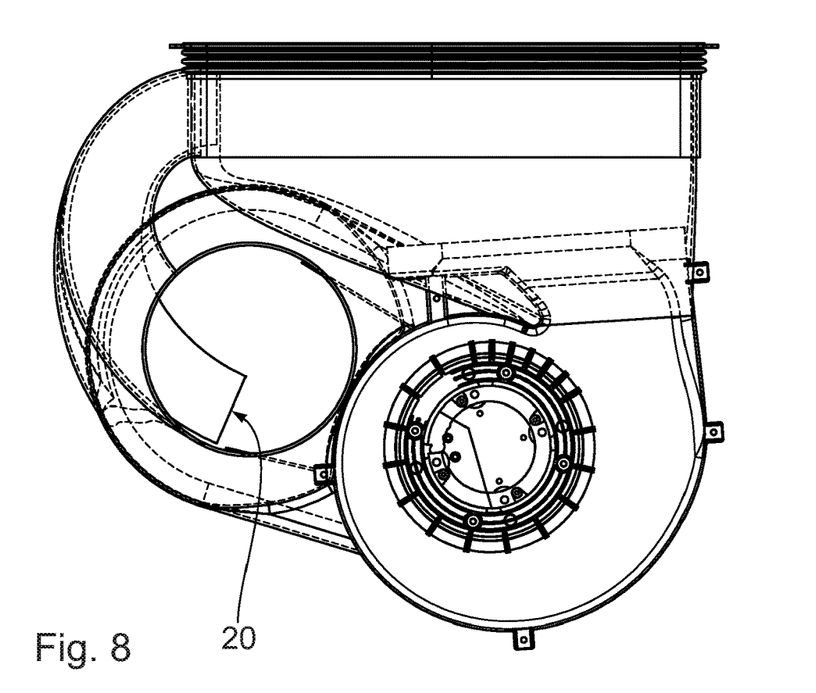
FIG. 8 shows a diagrammatic illustration of the extractor fan apparatus in FIG. 7, the filter being arranged in the filter replacement space and protruding partially into the transport channel.

A further exemplary embodiment of the invention is described using FIG. 7 and FIG. 8. In contrast to the preceding exemplary embodiments, the extractor fan apparatus 2 has one fan 14 and one filter 20 which can be arranged on the filter seat 19, the transport channel 26 being of simply curved configuration. The closure flap 27 is arranged on the side of the positive pressure channel section 17 of the transport channel 26. The closure flap 27 can be actuated by way of the drive device 34. The drive device 34 is configured to move the filter 20 along the filter replacement space 21. The flow opening 22 is of planar configuration.

In order to remove the filter 20 from the extractor fan apparatus 2, a program for removing the filter 20 is activated in the control unit 9 via the user interface 10. In a manner which is controlled by the control unit 9, the closure flap 27 is moved from the closure position 28 into the open position 29 by means of the drive device 34. By means of the drive device 34, the filter 20 is subsequently moved along the transport channel 26 through the filter replacement space 21 into the negative pressure channel section 18. The filter 20 can subsequently be removed by hand from the inflow opening 11.

Figure 9:
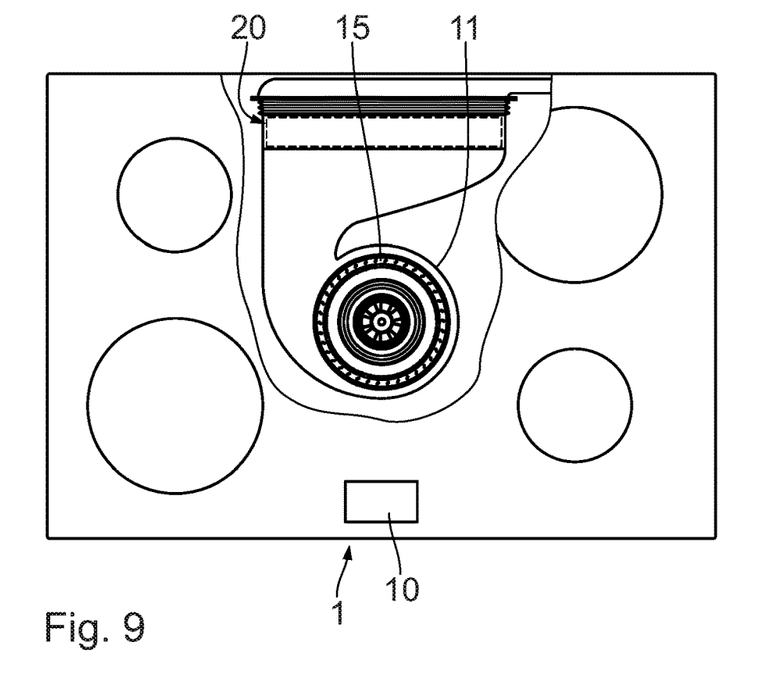
FIG. 9 shows a diagrammatic illustration of a hob system in accordance with a further exemplary embodiment, according to which a fan comprises a removable fan impeller, the filter replacement space being configured by way of a flow channel of the extractor fan apparatus, and the filter being arranged on the filter seat.

A further exemplary embodiment of the invention is described using FIG. 9. In contrast to the preceding exemplary embodiments, the fan impeller 15 of the fan 14 is arranged centrally below the inflow opening 11. The fan impeller 15 is dimensioned in such a way that it is removable from the inflow opening 11. The filter replacement space 21 is configured by way of the flow channel 12.

In order to remove the filter 20 from the filter seat 19, first of all the fan impeller 15 is removed from the flow channel 12 through the inflow opening 11. As a result, the filter replacement space 21 which is configured by way of the flow channel 12 is freed up to such an extent that the filter 20 is removable from the filter seat 19 through the inflow opening 11. The extractor fan apparatus 2 in accordance with this exemplary embodiment does not have a transport channel 26, and a closure flap 27 is not necessary. The features on which the exemplary embodiment in accordance with FIG. 9 is based can be combined as desired with those of the preceding exemplary embodiments.

Figure 10:
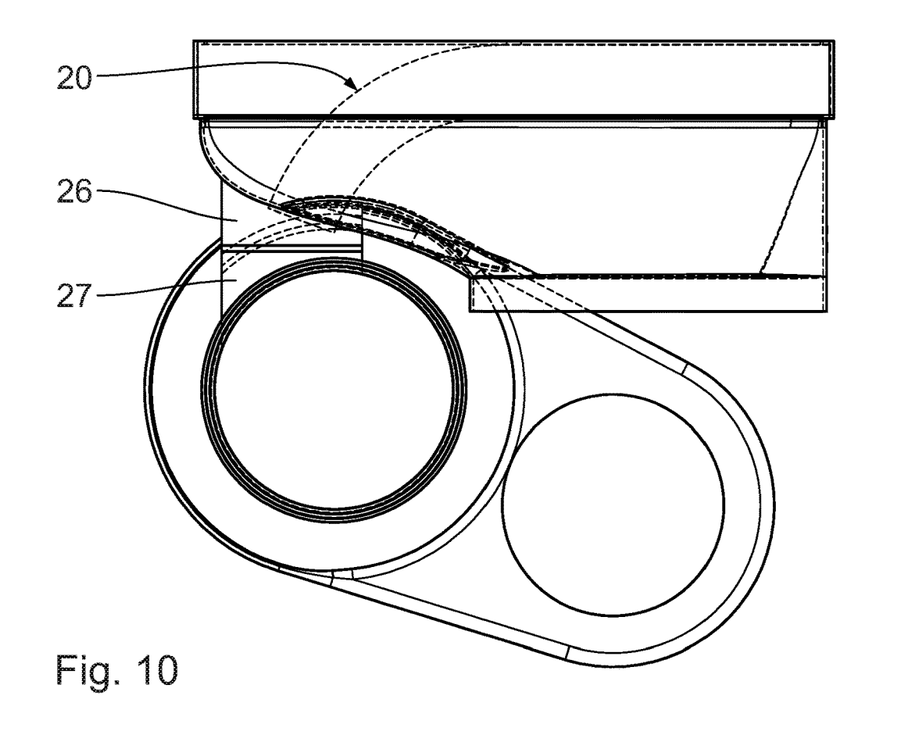
FIG. 10 shows a diagrammatic illustration of an extractor fan apparatus in accordance with one alternative exemplary embodiment, according to which the filter is arranged in a curved shape on the filter seat.

A further exemplary embodiment of the invention is described using FIG. 10. In contrast to the preceding exemplary embodiments, the flow opening 22 is of curved configuration. The filter 20 is arranged in a curved shape on the filter seat 19. The filter replacement space 21 comprises the transport channel 26 and can be closed by means of the closure flap 27 against a throughflow of cooking vapours.

The removal of the filter 20 from the filter seat 19 and the insertion of the filter 20 into the filter seat 19 take place as has already been described using the above-described embodiments.

In accordance with a further embodiment (not shown), a guide device 25 in the form of a slotted guide is arranged in the filter replacement space 21. In order to configure the slotted guide, the filter replacement space 21 has a groove, in which a frame of the filter 20 is mounted such that it can be displaced linearly at least in sections. The filter seat is of planar configuration.

In order to remove the filter 20, said filter 20 is displaced along the slotted guide, an end of the filter 20 which points towards the inflow opening 11 being first of all bent. After this, the filter 20 is situated in the position which is shown in FIG. 10. The filter 20 is moved further in the direction of the inflow opening 11 along the slotted guide. In order to remove the filter 20 from the extractor fan apparatus 2, the steps which have already been described using the above-described embodiments are to be carried out.

What is claimed is:

1. An extractor fan apparatus for extracting cooking vapors downwards, the extractor fan apparatus comprising:
   at least one fan for aspirating the cooking vapors;
   an inflow opening for the entry of the cooking vapors into the extractor fan apparatus;
   a filter seat which is arranged downstream of the at least one fan and on which at least one filter for filtering the cooking vapors can be arranged;
   a filter replacement space which extends between the inflow opening and the at least one filter seat, the filter replacement space being configured in such a way that the at least one filter is reversibly removable from the filter seat through the inflow opening, the filter replacement space being configured at least in sections by way of a flow channel for guiding the cooking vapors; and
   a closure flap for reversible closure with respect to a through flow with the cooking vapors is arranged in the filter replacement space, wherein the closure flap is oriented vertically.

2. The extractor fan apparatus according to claim 1, wherein a guide device for the guided displacement of the at least one filter is arranged in the filter replacement space, at least the inflow opening, the filter space and the flow channel for guiding the cooking vapors defining a filter insertion and filter removal path.

3. The extractor fan apparatus according to claim 1, wherein the filter seat has at least one of a sealing means and a sealing face for the fluid-tight connection to the at least one filter, at least a portion of the filter seat being located laterally adjacent to the closure flap.

4. The extractor fan apparatus according to claim 1, wherein a transport channel is arranged in the filter replacement space, through which transport channel the at least one filter can be moved, and which transport channel extends outside the at least one fan, between a negative pressure channel section which is arranged upstream of the at least one fan and the filter seat.

5. The extractor fan apparatus according to claim 1, further comprising a control unit for operating the at least one fan with a sensor device which is signal-connected to the control unit, the control unit being configured to interrupt the operation of the at least one fan on the basis of a signal of the sensor device.

6. The extractor fan apparatus according to claim 1, wherein the filter seat has a flow opening which can be covered by the at least one filter and through which the cooking vapors can flow, said flow opening having a main dimension which is greater than a main dimension of the inflow opening.

7. The extractor fan apparatus according to claim 6, wherein an opening area of the flow opening is greater than an inflow area of the inflow opening.

8. A hob system, comprising:
at least one extractor fan apparatus according to claim 1; and
at least one hob for heating food to be cooked.

9. The hob system according to claim 8, wherein the inflow opening is surrounded completely by a hot plate of the hob in a plan view, the inflow opening, the filter seat and the filter replacement space defining at least a portion of a filter insertion and removal path, wherein a section of the filter insertion and removal path extending through the inflow opening is perpendicular to the hot plate.

10. The hob system according to claim 9, wherein the closure flap is perpendicular to the hot plate when the closure flap is in a closed position.

11. The hob system according to claim 8, wherein the hob system is configured as a combination device, the flow channel for guiding the cooking vapors defining at least a portion of a filter insertion and removal path for inserting and removing the at least one filter.

12. The extractor fan apparatus according to claim 1, wherein the closure flap is configured to separate a section of the filter replacement space which is connected to a negative pressure channel section from a section of the filter replacement space which is connected to a positive pressure channel section.

13. The extractor fan apparatus according to claim 1, wherein the at least one filter is reversibly deformable.

14. The extractor fan apparatus according to claim 13, wherein the filter is configured as one of an odor filter, a grease filter and a moisture filter.

15. An extractor fan apparatus for extracting cooking vapors downwards, the extractor fan apparatus comprising:
at least one fan for aspirating the cooking vapors;
an inflow opening for the entry of the cooking vapors into the extractor fan apparatus;
a filter seat which is arranged downstream of the at least one fan and on which at least one filter for filtering the cooking vapors can be arranged;
a filter replacement space which extends between the inflow opening and the at least one filter seat, the filter replacement space being configured at least in sections by way of a flow channel for guiding the cooking vapors; and
a closure flap arranged in the filter replacement space, the closure flap comprising a closure position and an open position, the closure flap closing the filter seat when the closure flap is in the closure position, wherein the closure flap extends in a vertical direction when the closure flap is in the closure position, the filter replacement space being configured in such a way that the at least one filter is reversibly removable from the filter seat through the inflow opening when the closure flap is in the open position.

16. An extractor fan apparatus for extracting cooking vapors downwards, the extractor fan comprising:
at least one fan for aspirating the cooking vapors;
an inflow opening for the entry of the cooking vapors into the extractor fan apparatus;
a filter seat on which at least one filter for filtering the cooking vapors can be arranged; and
a filter replacement space which extends between the inflow opening and the at least one filter seat, the filter replacement space being configured in such a way that the at least one filter is reversibly removable from the filter seat through the inflow opening, wherein the filter seat has a flow opening which can be covered by the at least one filter and through which the cooking vapors can flow, said flow opening having a main dimension which is greater than a main dimension of the inflow opening, the filter replacement space being configured at least in sections by way of a flow channel for guiding the cooking vapors, wherein the at least one fan comprises a fan impeller that is arranged centrally below the inflow opening.

17. The extractor fan apparatus according to claim 16, wherein a guide device for the guided displacement of the at least one filter is arranged in the filter replacement space, wherein at least the flow channel and the inflow opening define a filter insertion and removal path for inserting and removing the filter.

18. The extractor fan apparatus according to claim 16, wherein the at least one filter is reversibly deformable.

19. The extractor fan apparatus according to claim 16, wherein the filter is configured as one of an odor filter, a grease filter and a moisture filter.

20. The extractor fan apparatus according to claim 16, wherein the filter replacement space is configured in such a way that the at least one filter is guided between an upper and a lower wall during introduction of the at least one filter into the filter seat.

21. The extractor fan apparatus according to claim 16, wherein the filter replacement space extends parallel to the hot plate at least in sections.

22. The extractor fan apparatus according to claim 21, wherein the filter seat in a plan view is completely covered by a hot plate of a hob for heating food to be cooked.

* * * * *